(12) United States Patent
Luo (10) Patent No.: US 12,366,320 B2
(45) Date of Patent: Jul. 22, 2025

(54) TELEVISION (TV) MOUNT STRUCTURE WITH ADJUSTABLE SUPPORT FORCE

(71) Applicant: STRONKIN ELECTRONICS CO., LTD, Taizhou (CN)

(72) Inventor: Yuqing Luo, Taizhou (CN)

(73) Assignee: STRONKIN ELECTRONICS CO., LTD, Taizhou (CN)

( * ) Notice: Subject to any disclaimer, the term of this patent is extended or adjusted under 35 U.S.C. 154(b) by 0 days.

(21) Appl. No.: 18/559,796

(22) PCT Filed: Mar. 29, 2023

(86) PCT No.: PCT/CN2023/084556
§ 371 (c)(1),
(2) Date: Nov. 9, 2023

(87) PCT Pub. No.: WO2024/130881
PCT Pub. Date: Jun. 27, 2024

(65) Prior Publication Data
US 2025/0084955 A1 Mar. 13, 2025

(30) Foreign Application Priority Data
Dec. 19, 2022 (CN) .......................... 202223407965.1

(51) Int. Cl.
*F16M 11/04* (2006.01)
(52) U.S. Cl.
CPC ..... *F16M 11/046* (2013.01); *F16M 2200/047* (2013.01)
(58) Field of Classification Search
CPC ............. F16M 11/28; F16M 2200/047; F16M 11/046; F16M 11/26
USPC .......................................................... 348/825
See application file for complete search history.

(56) References Cited

U.S. PATENT DOCUMENTS

| | | | | |
|---|---|---|---|---|
| 7,762,515 B2* | 7/2010 | Lin | ........................ | F16M 11/10 248/447 |
| 7,874,530 B2* | 1/2011 | Kim | ..................... | F16M 11/046 248/176.1 |
| 9,829,151 B1* | 11/2017 | Stenhouse | .............. | F16M 11/16 |
| 2003/0234332 A1* | 12/2003 | Yen | ........................ | F16M 11/28 248/404 |
| 2007/0034756 A1* | 2/2007 | Tsai | ....................... | F16M 11/28 248/161 |

(Continued)

*Primary Examiner* — Christopher Garft
(74) *Attorney, Agent, or Firm* — Bayramoglu Law Ofices LLC (57) ABSTRACT

The utility model provides a television (TV) mount structure with an adjustable support force. The TV mount structure includes a first post, a second post, and multiple balancing devices, where the first post includes one end connected to a TV and the other end provided with a moving part of the balancing device; a stationary part of the balancing device is fixed at one end of the second post; and the second post and the first post are parallel, and movably connected axially. The utility model relies on the balancing devices to provide a constant support force to keep the TV at any height position without the need to lock the TV, saving time and labor. The utility model can adjust the constant support force to support TVs of different weights by combining the multiple balancing devices, and further increase the support weight by combining multiple TV mount structures with an adjustable support force.

9 Claims, 10 Drawing Sheets

(56) References Cited

U.S. PATENT DOCUMENTS

| | | | |
|---|---|---|---|
| 2013/0168335 A1* | 7/2013 | Gillespie | F16M 11/041 |
| | | | 211/26 |
| 2013/0233984 A1* | 9/2013 | Huang | F16M 11/046 |
| | | | 248/162.1 |
| 2017/0114944 A1* | 4/2017 | Ho | F16M 11/22 |
| 2017/0261150 A1* | 9/2017 | Lee | F16M 11/046 |
| 2018/0020825 A1* | 1/2018 | Hung | F16M 11/2014 |
| | | | 108/31 |
| 2022/0390060 A1* | 12/2022 | Ho | F16M 11/24 |
| 2024/0019075 A1* | 1/2024 | Davidson | F16M 13/02 |

* cited by examiner

TELEVISION (TV) MOUNT STRUCTURE WITH ADJUSTABLE SUPPORT FORCE

TECHNICAL FIELD

The utility model relates to the technical field of television (TV) mounts, and in particular to a TV mount structure with an adjustable support force.

BACKGROUND

At present, the screen size of televisions (TVs), one of the widely used items in people's daily life, is constantly evolving to suit different needs. Different screen sizes correspond to different TV weights. TV mounts that are configured to support TVs often have a limited bearing capacity, which leads to poor versatility.

The existing TV mounts are typically provided with screws for fastening when the height of the TV is adjusted. Adjusting the height of a large-screen TV requires a person to hold the TV while another person to manually adjust the height of the TV, which is laborious and time-consuming.

In addition, the screws are often tightened through prefabricated screw holes, which limits the height adjustment positions of the TV mount and fails to achieve free adjustments of the TV mount.

SUMMARY

An objective of the utility model is to provide a television (TV) mount structure with an adjustable support force, in order to solve most if not all of the aforementioned technical problems existing in the prior art.

To solve the above technical problems, the utility model provides a TV mount structure with an adjustable support force. The TV mount structure includes a first post, a second post, and multiple balancing devices, where the first post includes one end connected to a TV and the other end provided with a moving part of the balancing device; a stationary part of the balancing device is fixed at one end of the second post; and the second post and the first post are parallel, and movably connected axially.

In the above structure, the balancing devices can provide a constant support force to keep the TV at any height position without the need to lock the TV, saving time and labor. By combining the multiple balancing devices, the constant support force can be adjusted to support TVs of different weights.

In a feasible embodiment, the second post has a hollow structure, and is sheathed outside the first post to save space.

In a feasible embodiment, the balancing device includes a constant-force spring; the constant-force spring includes a metal sheet curled into a drum-shaped structure; the drum-shaped structure serves as the moving part; and an end of the metal sheet away from the drum-shaped structure serves as the stationary part.

In the above structure, the metal sheet undergoes a linear stretching motion within an effective stroke to provide a constant elastic balance for balancing the weight of the supported TV.

In a feasible embodiment, the balancing device further includes a fixed shaft for detachably fixing the moving part of the balancing device to the second post.

In a feasible embodiment, the fixed shaft passes through a center of the drum-shaped structure, and is detachably fixed to the second post; and a fixing position of the fixed shaft does not affect the effective stroke of another balancing device.

In a feasible embodiment, the fixed shaft includes a threaded part and a head; the head is provided at one end of the fixed shaft; a top of the head is provided with a cross keyway; the other end of the fixed shaft is provided with the threaded part; the threaded part is matched with a screw hole provided on the second post to quickly lock the fixed shaft through a cross screwdriver, thereby fixing or loosening the balancing device; when the balancing device is fixed, no constant support force is provided; and when the balancing device is released, a certain constant support force is provided.

In a feasible embodiment, the multiple balancing devices are connected in series to save a lateral space of the TV mount structure.

In a feasible embodiment, the first post further includes a limiting device for limiting an axial position of the first post relative to the second post, in order to provide overload protection when the weight of the TV exceeds a support force.

In a feasible embodiment, the limiting device includes a limiting member; the limiting member is fixed on a surface of the first post; and the limiting member cannot enter an interior of the second post.

In a feasible embodiment, the second post is further provided with an axial open slot, which facilitates observation and adjustment of the axial position of the balancing device inside the second post, facilitating structural assembly.

In a feasible embodiment, multiple TV mount structures are provided, each including the first post, the second post, and the multiple balancing devices; the multiple TV mount structures are arranged in parallel and fixed through a connecting part.

In the above structure, the multiple TV mount structures can be connected in parallel to further enhance the support force and suit the support requirement for a larger weight.

In a feasible embodiment, the connecting part includes a connecting plate and multiple bolts; threaded parts of the bolts are matched with multiple screw holes arranged on a surface of the connecting part; the second post includes a first side and a second side; the first side is provided with a through hole allowing for the threaded part of the bolt, instead of a head of the bolt, to pass through; and the second side is opposite to the first side, and offers a corresponding position provided with a through hole allowing for the bolt to pass through as a whole.

In the above structure, the multiple bolts can be respectively screwed into the screw holes of the connecting part from the interior of two second posts for fastening, ensuring that the overall appearance of the TV mount structure is simple and the TV mount structure is not easily damaged and disassembled from the outside.

With the above technical solution, the utility model has the following beneficial effects:

The utility model relies on the balancing devices to provide a constant support force to keep the TV at any height position without the need to lock the TV. TV supporting and height adjustment operations can be completed by only one person, saving time and labor. The utility model can adjust the constant support force to support TVs of different weights by combining the multiple balancing devices, and further increase the support weight by combining multiple TV mount structures with an adjustable support force.

BRIEF DESCRIPTION OF THE DRAWINGS

To describe the technical solutions in the specific implementations of the utility model or the prior art more clearly, the drawings required for describing the specific implementations or the prior art are briefly described below. Apparently, the drawings in the following description show merely some implementations of the utility model, and those of ordinary skill in the art may still derive other drawings from these drawings without creative efforts.

REFERENCE NUMERALS 1. structure body; 101. first post; 102. sheath; 103. auxiliary plate; 104. second post; 1041. open slot; 105. buffer housing; 106. constant-force spring; 107. housing; 108. fixed shaft; and 2. connecting plate.

DETAILED DESCRIPTION OF THE EMBODIMENTS

The following clearly and completely describes the technical solutions of the utility model with reference to drawings. Apparently, the described embodiments are merely some rather than all of the embodiments of the utility model. All other embodiments derived from the embodiments of the utility model by those of ordinary skill in the art without creative efforts shall fall within the protection scope of the utility model.

It should be understood that in the description of the utility model, terms such as "central", "upper", "lower", "left", "right" "vertical", "horizontal", "inside", and "outside" indicate the orientation or position relationships based on the drawings. They are merely intended to facilitate and simplify the description of the utility model, rather than to indicate or imply that the mentioned device or components must have a specific orientation or must be constructed and operated in a specific orientation. Therefore, these terms should not be construed as a limitation to the utility model. Moreover, the terms "first", "second", and "third" are used only for the purpose of description, and are not intended to indicate or imply relative importance.

In the description of the utility model, it should be noted that, unless otherwise clearly specified, meanings of terms "install", "connected with", and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two components. Those of ordinary skill in the art may understand specific meanings of the above terms in the utility model based on a specific situation.

The utility model is further described below with reference to specific implementations.

An embodiment of the utility model provides a TV mount structure with an adjustable support force. The TV mount structure includes a first post, a second post, and multiple balancing devices. The first post includes one end connected to a TV and the other end provided with a moving part of the balancing device. A stationary part of the balancing device is fixed at one end of the second post. The second post and the first post are parallel, and movably connected axially.

In the above structure, the balancing devices can provide a constant support force to keep the TV at any height position without the need to lock the TV, saving time and labor. By combining the multiple balancing devices, the constant support force can be adjusted to support TVs of different weights.

Further, the second post has a hollow structure, and is sheathed outside the first post to save space.

Further, the balancing device includes a constant-force spring; the constant-force spring includes a metal sheet curled into a drum-shaped structure; the drum-shaped structure serves as the moving part; and an end of the metal sheet away from the drum-shaped structure serves as the stationary part.

In the above structure, the metal sheet undergoes a linear stretching motion within an effective stroke to provide a constant elastic balance for balancing the weight of the supported TV.

Of course, other well-known constant-force springs in the art can also be used to achieve the same technical effect.

Further, the balancing device further includes a fixed shaft for detachably fixing the moving part of the balancing device to the second post.

Further, the fixed shaft passes through a center of the drum-shaped structure, and is detachably fixed to the second post; and a fixing position of the fixed shaft does not affect the effective stroke of another balancing device.

Further, the fixed shaft includes a threaded part and a head; the head is provided at one end of the fixed shaft; a top of the head is provided with a cross keyway; the other end of the fixed shaft is provided with the threaded part; the threaded part is matched with a screw hole provided on the second post to quickly lock the fixed shaft through a cross screwdriver, thereby fixing or loosening the balancing device; when the balancing device is fixed, no constant support force is provided; and when the balancing device is released, a certain constant support force is provided.

Further, the multiple balancing devices are connected in series to save a lateral space of the TV mount structure.

Further, the first post further includes a limiting device for limiting an axial position of the first post relative to the second post, in order to provide overload protection when the weight of the TV exceeds a support force.

Further, the limiting device includes a limiting member; the limiting member is fixed on a surface of the first post; and the limiting member cannot enter an interior of the second post.

Preferably, the second post is further provided with an axial open slot, which facilitates observation and adjustment of the axial position of the balancing device inside the second post, facilitating structural assembly.

Further, multiple TV mount structures are provided, each including the first post, the second post, and the multiple balancing devices; the multiple TV mount structures are arranged in parallel and fixed through a connecting part.

In the above structure, the multiple TV mount structures can be connected in parallel to further enhance the support force and suit the support requirement for a larger weight.

Preferably, the connecting part includes a connecting plate and multiple bolts; threaded parts of the bolts are matched with multiple screw holes arranged on a surface of the connecting part; the second post includes a first side and a second side; the first side is provided with a through hole allowing for the threaded part of the bolt, instead of a head of the bolt, to pass through; and the second side is opposite to the first side, and offers a corresponding position provided with a through hole allowing for the bolt to pass through as a whole.

In the above structure, the multiple bolts can be respectively screwed into the screw holes of the connecting part from the interior of two second posts for fastening, ensuring that the overall appearance of the TV mount structure is simple and the TV mount structure is not easily damaged and disassembled from the outside.

With the above technical solution, the utility model has the following beneficial effects:

In the embodiment of the utility model, the balancing devices can provide a constant support force to keep the TV at any height position without the need to lock the TV. TV supporting and height adjustment operations can be completed by only one person, saving time and labor. The utility model can adjust the constant support force to support TVs of different weights by combining the multiple balancing devices, and further increase the support weight by combining multiple TV mount structures with an adjustable support force.

Embodiment 1

Figure 1:
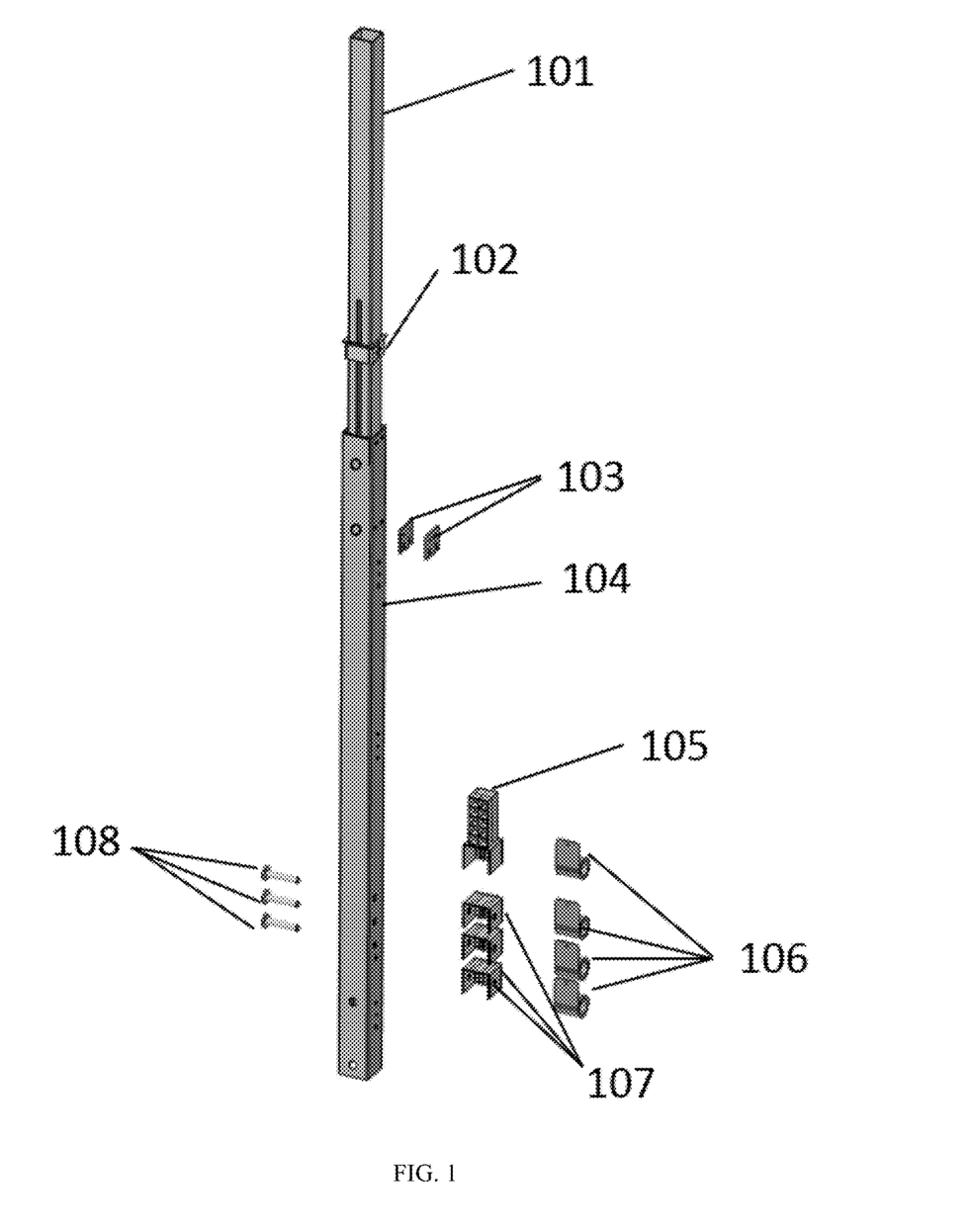
FIG. 1 is an exploded view of a television (TV) mount structure with an adjustable support force according to a first embodiment of the utility model.

As shown in FIG. 1, this embodiment provides a TV mount structure with an adjustable support force. The TV mount structure specifically includes first post 101, limiting member 102, multiple auxiliary plates 103, second post 104, buffer housing 105, four constant-force springs 106, three housings 107, and three fixed shafts 108.

The first post 101 is a SGCC T2.0 (hot-dip galvanized steel sheet, wall thickness 2 mm) square tube, which is provided with a positioning groove on one side. The second post 104 is a SGCC T1.6 (hot-dip galvanized steel sheet, wall thickness 1.6 mm) square tube, with a size slightly larger than that of the first post 101, and sheathed outside the first post 101.

Figure 2:
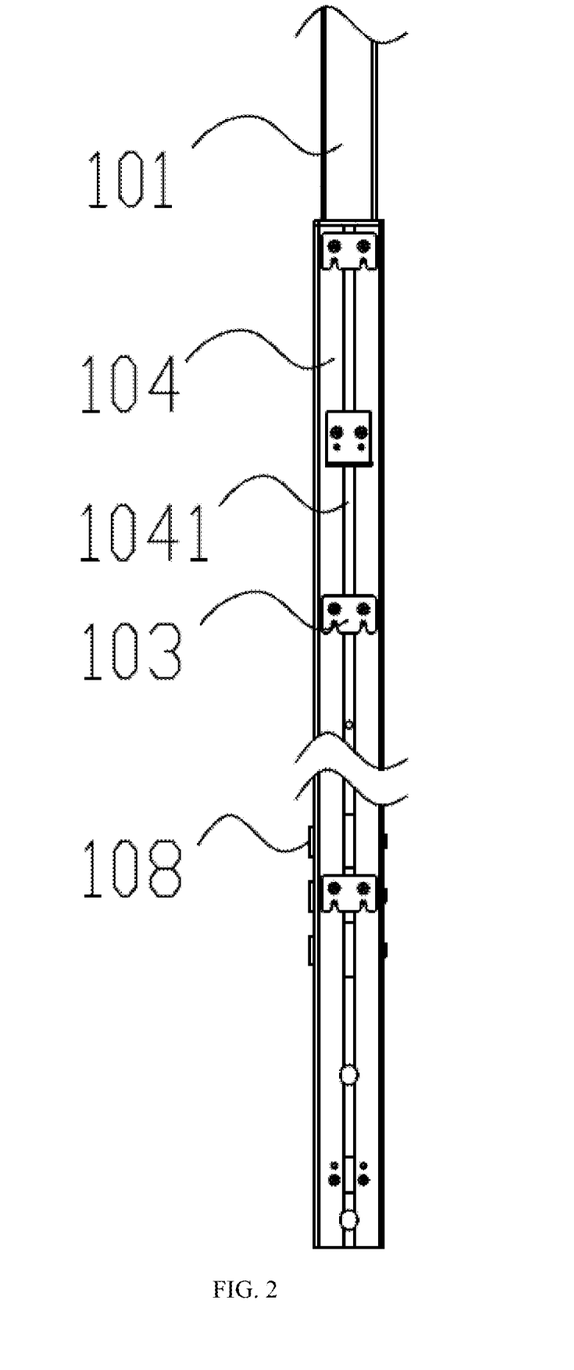
FIG. 2 is a front view of the TV mount structure shown in FIG. 1.

As shown in FIG. 2, s side of the second post 104 is provided with axially penetrating open slot 1041 for observing and adjusting an axial position of a balancing device inside the second post 104, facilitating structural assembly. Left and right ends of the open slot 1041 are uniformly provided with the multiple auxiliary plates 103 along an axial direction. The auxiliary plates 103 can be SGCC T2.0 auxiliary plates. Two sides of the open slot 1041 are secured with multiple positioning pins and screws to maintain the stability of the square tube structure of the second post 104 and avoid deformation and failure due to the open slot 1041.

Figure 3:
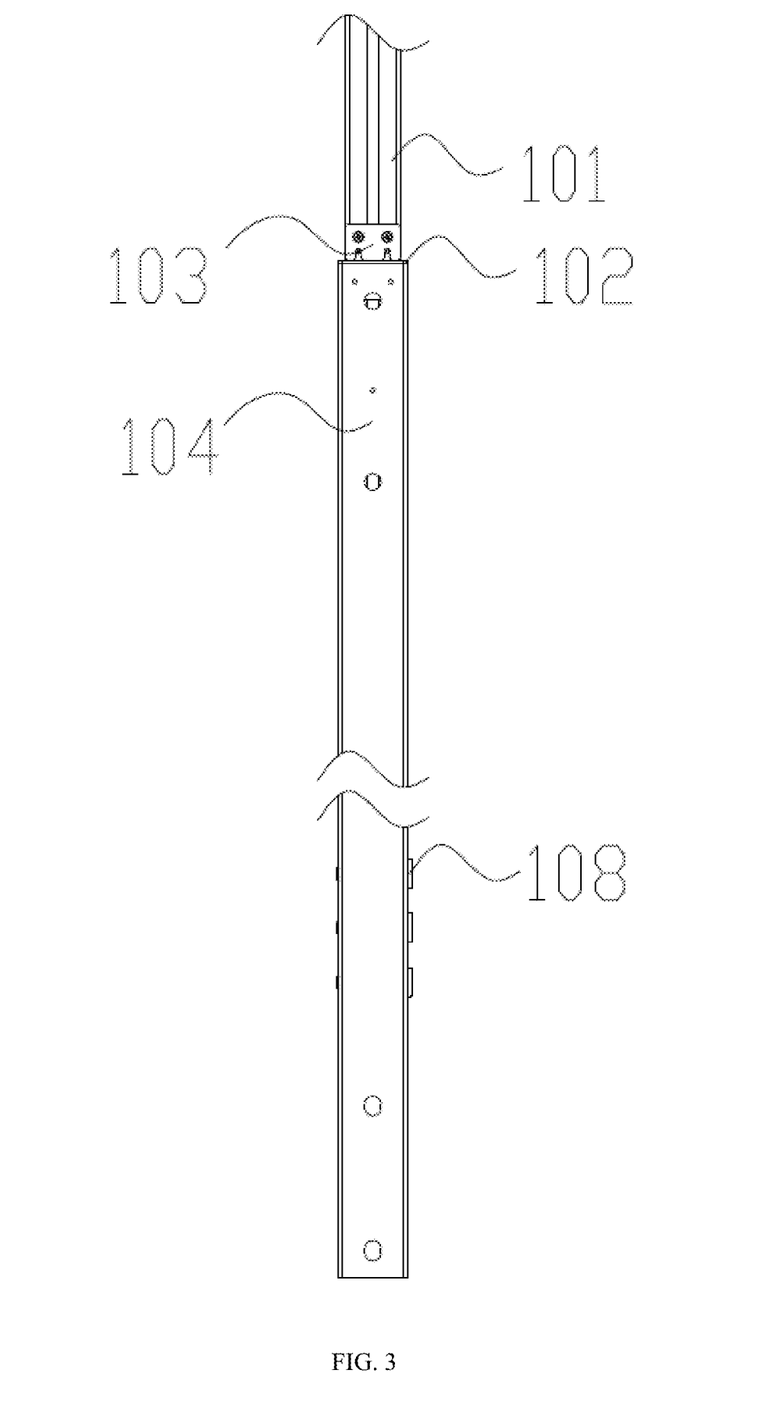
FIG. 3 is a rear view of the TV mount structure shown in FIG. 2.
Figure 4:
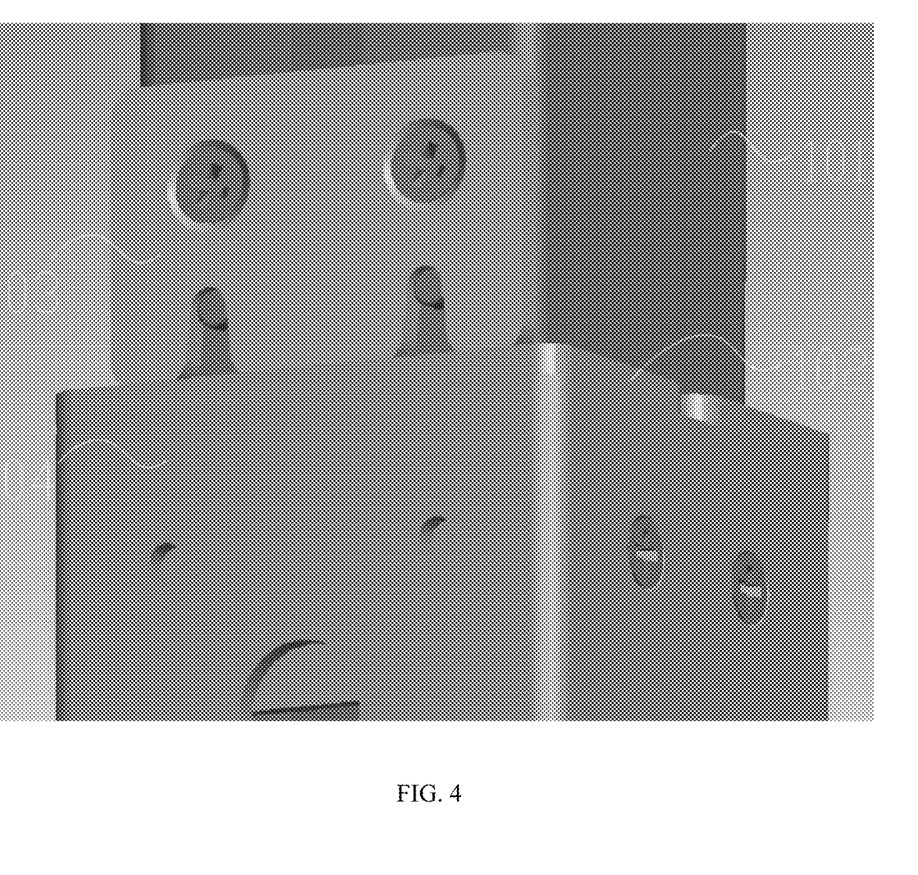
FIG. 4 is a schematic diagram of axial limiting between a first post and a second post shown in FIG. 2.

As shown in FIG. 3, sheath 102 is provided at an edge of an end of the second post 104 close to the first post 101. The sheath 102 is made of polyformaldehyde (POM). It fits a shape of the end of the square tube to wrap and protect an iron sheet of the square tube at the end, so as to prevent the limiting member on the surface of the first post 101 from damaging the edge of the end. The limiting member can be served by the auxiliary plate 103, as shown in FIG. 4.

Figure 5:
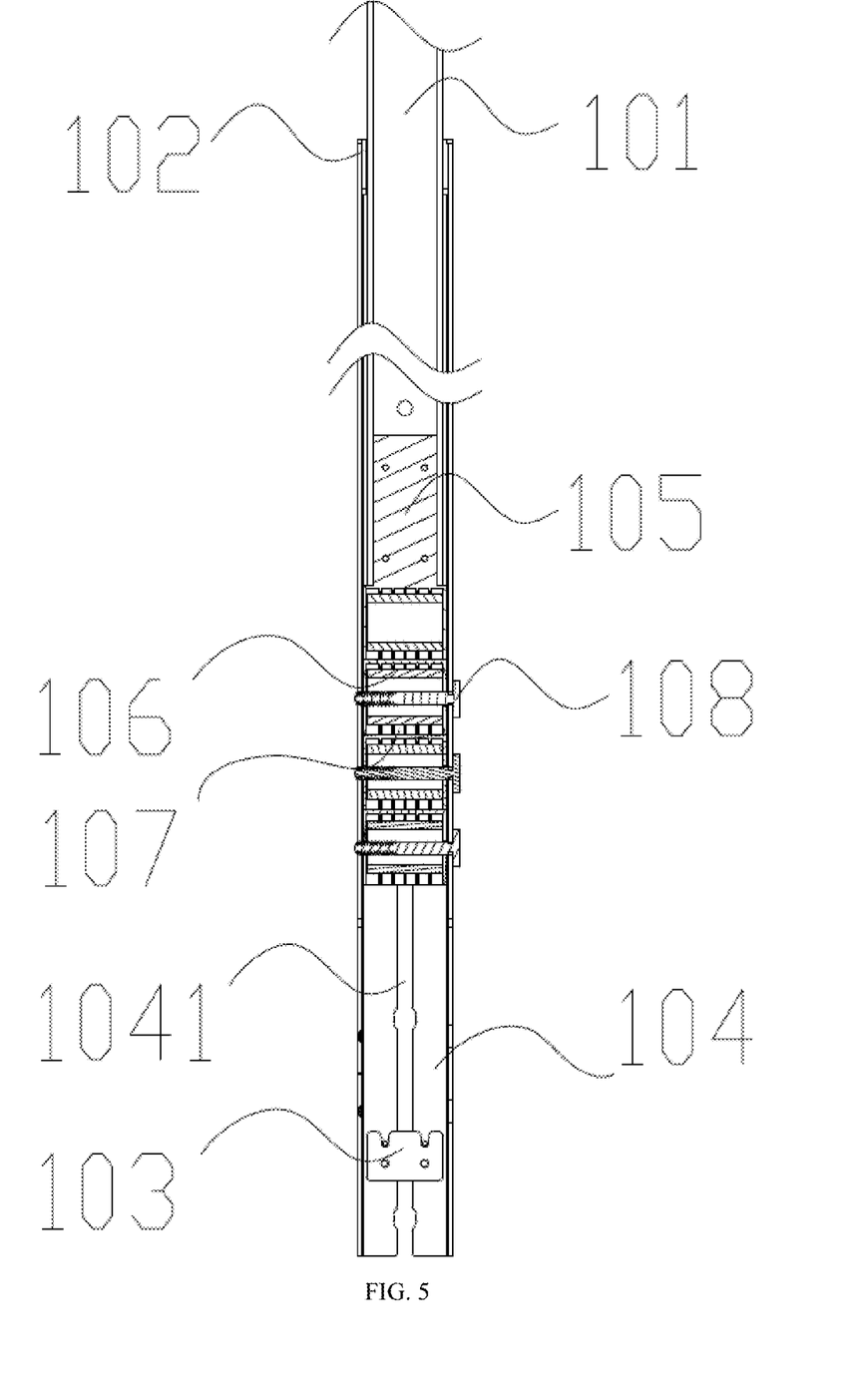
FIG. 5 is a section view of the TV mount structure shown in FIG. 3.

As shown in FIG. 5, an end of the first post 101 extended into the second post 104 is fixedly connected to the buffer housing 105. The buffer housing 105 is made of POM, and an end of the buffer housing away from the first post is provided therein with the constant-force spring 106.

The constant-force spring belongs to the prior art. Simply put, the constant-force spring is an SUS301 (austenitic steel) sheet coiled into a drum-shaped structure. The drum-shaped structure serves as a moving part, and an end of the metal sheet away from the drum-shaped structure serves as a stationary part. The metal sheet undergoes a linear stretching motion within an effective stroke to provide a constant elastic force for balancing an external force at any position within the effective stroke.

Specific parameters of the constant-force springs 106 include:

width: 30 mm; thickness: 0.21 mm; single-spring inside diameter: 17.5 mm; coil number: 7; single-spring outside diameter: 21.03 mm; double-spring outside diameter: 23.38 mm; single-spring force: 2.5 kg; double-spring force: 5 kg; spring index: 83.33; spring life: 6133; average diameter: 20.44 mm; circumference: 64.21 mm; and active coil number: 7.23.

Figure 6:
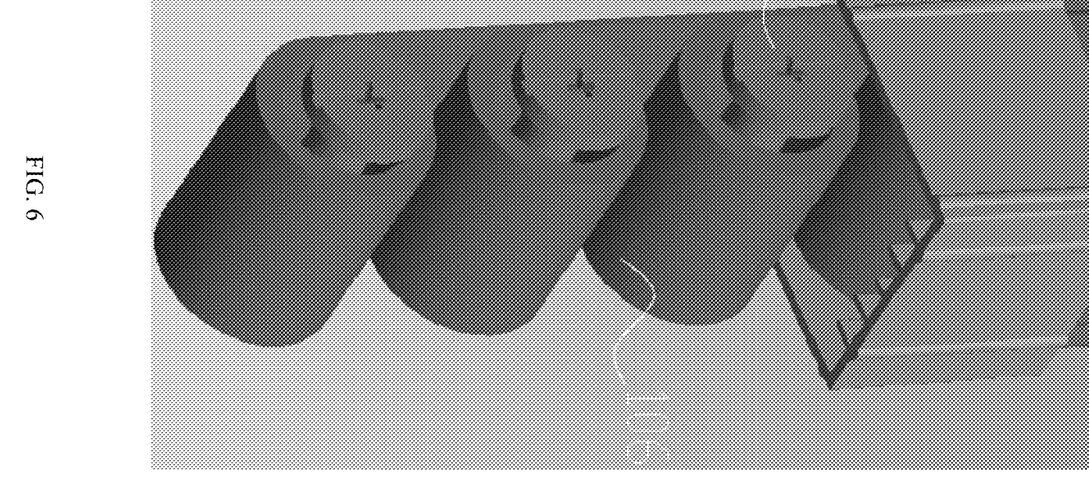
FIG. 6 is a schematic diagram of a buffer housing according to the first embodiment of the utility model.

An end of the buffer housing 105 away from the first post 101 is externally provided with the three housings 107 that are detachably connected in series. The housings 107 can be made of POM, and each housing 107 is provided therein with the constant-force spring 106. The stationary parts of the constant-force springs 106 are located on a same outer side of the housings 107, as shown in FIG. 6. To visually display the internal structure, the housings 107 are not shown in FIG. 6. The housings 107 are configured to protect the moving parts of the constant-force springs 106.

Figure 7:
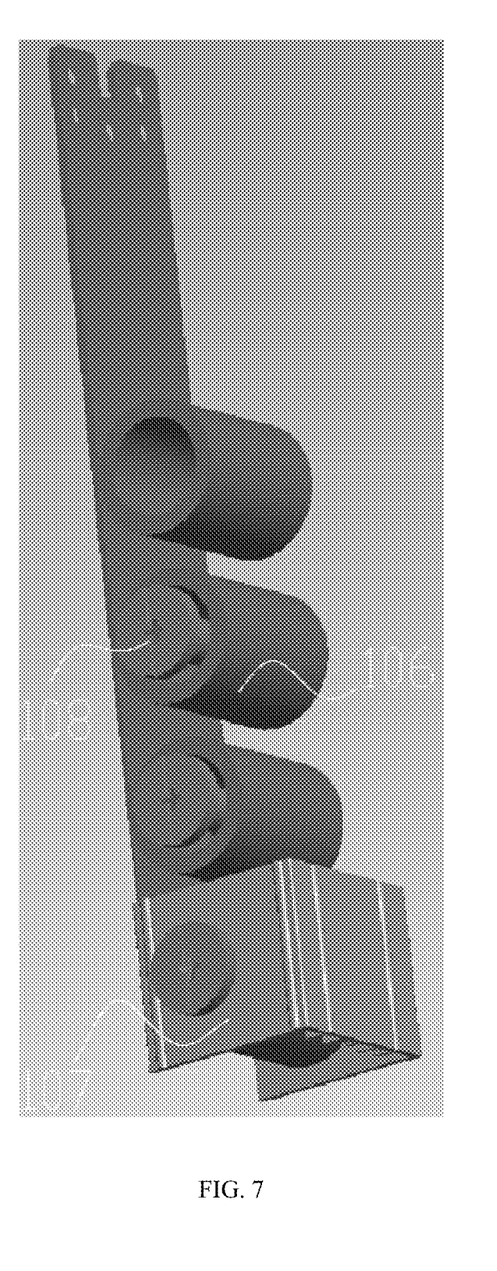
FIG. 7 is a schematic diagram of stationary parts of four constant-force springs according to the first embodiment of the utility model.

As shown in FIG. 7, the stationary parts of the four constant-force springs 106 are jointly fixed on one side wall of the second post 104.

Figure 8:
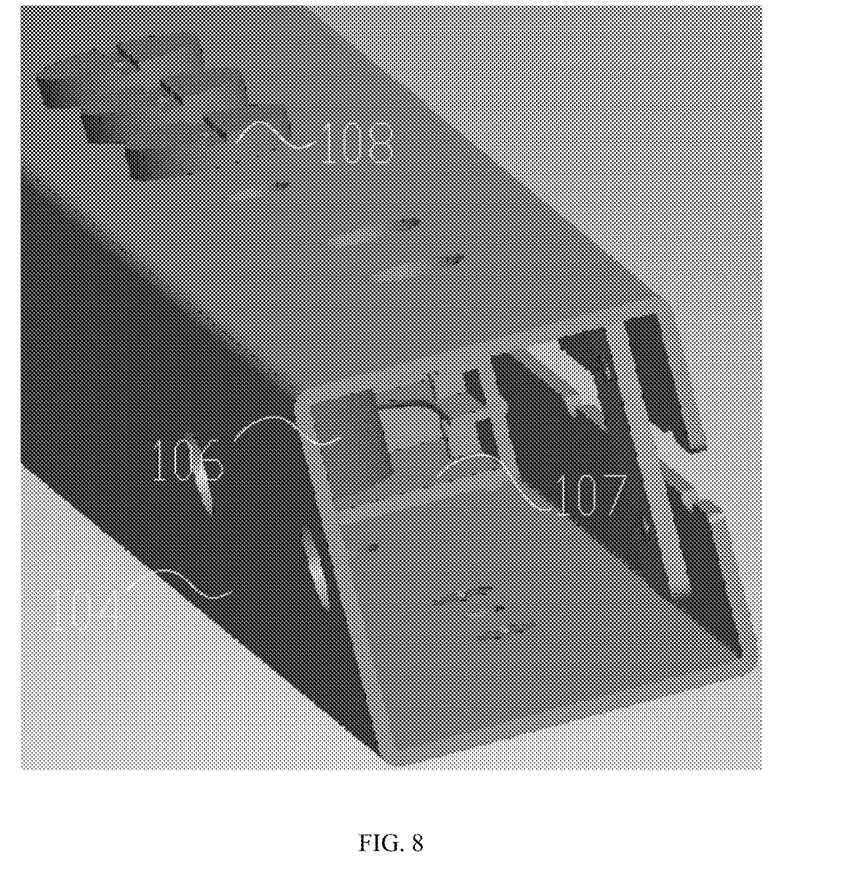
FIG. 8 is a schematic diagram of the constant-force springs assembled on the second post according to the first embodiment of the utility model.

The three housings 107 and the moving parts of the constant-force springs 106 in the three housings are respectively fixed on the aforementioned side wall of the second post 104 through the three fixed shafts 108. The fixing positions do not affect the effective stroke of any of the constant-force springs 106, as shown in FIG. 8. The fixed shafts 108 can be made of 1215 easy-to-cut steel. The fixed shaft 108 includes a threaded part and a head. A top of the head is provided with a cross keyway. The threaded part is matched with a screw hole provided on the second post 104 to quickly lock or release the fixed shaft 108 through a cross screwdriver, thereby fixing or releasing the moving part of the constant-force spring 106. When the moving part of the constant-force spring 106 is fixed, the balancing device does not provide the constant support force. When the moving part of the constant-force spring 106 is released, the balancing device provides a certain constant support force. The constant support force provided by each balancing device can be superimposed.

In the above structure, the TV can stay at any height within the effective stroke of the constant-force spring without the need to lock the TV. TV supporting and adjustment operations can be completed by only one person, saving time and labor. By combining the four balancing devices, the constant support force can be adjusted at four levels to support TVs of different weights.

Embodiment 2

Figure 9:
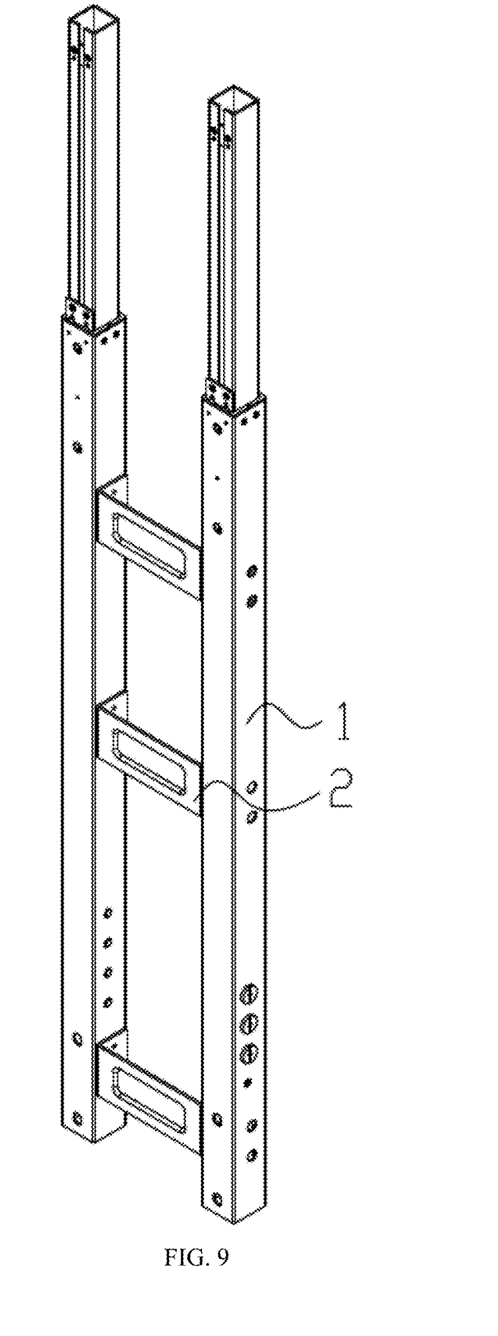
FIG. 9 is a schematic diagram of an assembly of TV mount structures with an adjustable support force according to a second embodiment of the utility model.

As shown in FIG. 9, two structure bodies 1 in Embodiment 1 are connected side by side through three connecting plates 2 and multiple bolts so as to provide a greater support force.

Further, the threaded parts of the bolts are matched with multiple screw holes arranged on a surface of the connecting plate 2. The second post 104 includes a first side and a second side. The first side is provided with a through hole allowing for the threaded part of the bolt, instead of a head of the bolt, to pass through. The second side of the second post 104 is opposite to the first side, and offers a corresponding position provided with a through hole allowing for the bolt to pass through as a whole.

In the above structure, the multiple bolts can be respectively screwed into the screw holes of the connecting plate 2 from the interior of two second posts 104 for fastening, ensuring that the overall appearance of the TV mount structure is simple and the TV mount structure is not easily damaged and disassembled from the outside.

Figure 10:
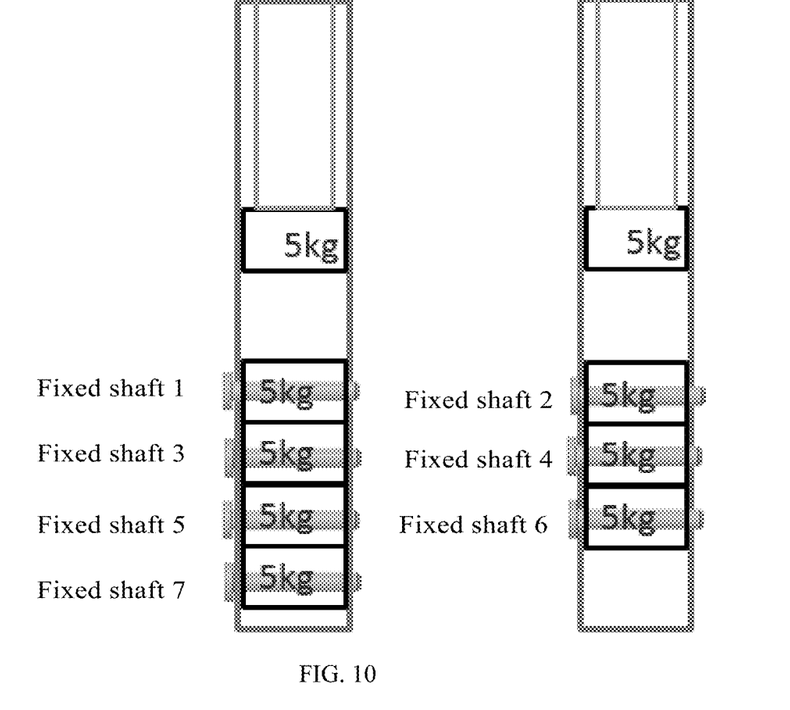
FIG. 10 is a schematic diagram showing adjustment of a constant support force of the assembly of the TV mount structures with an adjustable support force according to the first embodiment of the utility model.

Specifically, as shown in FIG. 10, assuming that one structure body 1 includes 5 constant-force springs 106, four of them are locked. Assuming that the other structure body 1 includes four constant-force springs 106, three of them are locked. Each constant-force spring 106 can provide 5 kg of support force. So, the fixed shafts 108 are sequenced from top to bottom. The one structure body 1 includes: fixed shaft 1, fixed shaft 3, fixed shaft 5, and fixed shaft 7. The other structure body 1 includes: fixed shaft 2, fixed shaft 4, and fixed shaft 6. The fixed shafts 108 are disassembled in sequence to provide different support forces. The number of fixed shafts disassembled and the corresponding constant support force provided are shown in the table below:

| Number of fixed shafts disassembled | Constant support force provided (kg) |
|---|---|
| 0 | 5 + 5 = 10 |
| 1 | 10 + 5 = 15 |
| 2 | 15 + 5 = 20 |
| 3 | 20 + 5 = 25 |
| 4 | 25 + 5 = 30 |
| 5 | 30 + 5 = 35 |
| 6 | 35 + 5 = 40 |
| 7 | 40 + 5 = 45 |

This embodiment illustrates that by combining multiple TV mount structures with an adjustable support force, the constant support force can be further increased, and the constant support force can be adjusted step by step.

Finally, it should be noted that the above embodiments is merely intended to describe the technical solutions of the utility model, rather than to limit the utility model. Although the utility model is described in detail with reference to the above embodiments, those of ordinary skill in the art understand that modifications can be made to the technical solutions described in the above embodiments or equivalent replacements can be made to some or all technical features thereof. However, these modifications or replacements do not cause the essence of the corresponding technical solutions to depart from the scope of the technical solutions of the embodiments of the utility model.

What is claimed is:

1. A television (TV) mount structure with an adjustable support force, comprising a first post, a second post, and a plurality of balancing devices, wherein the first post comprises a first end connected to a TV and a second end provided with a moving part of a first balancing device of the plurality of balancing devices; a stationary part of each of the plurality of balancing devices is fixed at one end of the second post; and the second post and the first post are parallel, and movably connected axially, wherein at least one other balancing device, of the plurality of balancing devices, other than the first balancing device further comprises a fixed shaft for detachably fixing the moving part of the other balancing device to the second post, wherein said fixed shaft passes through and aligns with a central axis of the moving part of the other balancing device such that fixing the moving part of the other balancing device with the fixed shaft causes the moving part of the other balancing device to not provide a constant support force and such that releasing the moving part of the other balancing device with the fixed shaft causes the moving part of the other balancing device to provide the constant support force.

2. The TV mount structure according to claim 1, wherein the second post has a hollow structure, and is sheathed outside the first post.

3. The TV mount structure according to claim 1, wherein each of the plurality of balancing devices comprises a constant-force spring.

4. The TV mount structure according to claim 3, wherein the constant-force spring comprises a metal sheet curled into a drum-shaped structure; the drum-shaped structure serves as the moving part; and an end of the metal sheet away from the drum-shaped structure serves as the stationary part.

5. The TV mount structure according to claim 1, wherein the fixed shaft comprises a threaded part and a head; the head is provided at a first end of the fixed shaft; a top of the head is provided with a cross keyway; and a second end of the fixed shaft is provided with the threaded part.

6. The TV mount structure according to claim 1, wherein the plurality of balancing devices are connected in series.

7. The TV mount structure according to claim 1, wherein the first post further comprises a limiting device for limiting an axial position of the first post relative to the second post.

8. The TV mount structure according to claim 1, wherein a plurality of TV mount structures are provided, each comprising the first post, the second post, and the plurality of balancing devices; the plurality of TV mount structures are arranged in parallel and fixed through a plurality of connecting parts.

9. The TV mount structure according to claim 8, wherein each of the plurality of connecting parts comprises a connecting plate and a plurality of bolts; threaded parts of the plurality of bolts are matched with a plurality of screw holes arranged on a surface of each of the plurality of connecting parts; the second post comprises a first side and a second side; the first side is provided with a through hole allowing for the threaded part of each of the plurality of bolts, instead of a head of each of the plurality of bolts, to pass through; and the second side is opposite to the first side, and offers a corresponding position provided with a through hole allowing for each of the plurality of bolts to pass through.

\* \* \* \* \*